United States Patent
Choi

(10) Patent No.: US 9,912,768 B1
(45) Date of Patent: Mar. 6, 2018

(54) MEASURING CONTENT CONSUMPTION

(71) Applicant: Nativo, Inc., El Segundo, CA (US)

(72) Inventor: Justin Yoo Choi, Newport Coast, CA (US)

(73) Assignee: Nativo, Inc., El Segundo, CA (US)

( * ) Notice: Subject to any disclaimer, the term of this patent is extended or adjusted under 35 U.S.C. 154(b) by 139 days.

(21) Appl. No.: 15/142,439

(22) Filed: Apr. 29, 2016

Related U.S. Application Data

(60) Provisional application No. 62/154,919, filed on Apr. 30, 2015.

(51) Int. Cl.
| | | |
|---|---|---|
| G06F 15/173 | (2006.01) | |
| H04L 29/08 | (2006.01) | |
| H04L 12/26 | (2006.01) | |

(52) U.S. Cl.
CPC ............ H04L 67/22 (2013.01); H04L 43/045 (2013.01); H04L 67/02 (2013.01)

(58) Field of Classification Search
CPC . G06Q 30/00; G06Q 30/0246; G06Q 30/0241
See application file for complete search history.

(56) References Cited

U.S. PATENT DOCUMENTS

| | | | | |
|---|---|---|---|---|
| 6,571,234 B1* | 5/2003 | Knight | ............... | G06Q 10/10 |
| 2002/0065802 A1* | 5/2002 | Uchiyama | ......... | G06F 17/30867 |
| 2003/0028441 A1* | 2/2003 | Barsness | ................ | G06Q 30/02 |
| | | | | 705/26.1 |
| 2003/0028451 A1* | 2/2003 | Ananian | ........... | G06F 17/30867 |
| | | | | 705/26.42 |
| 2004/0044571 A1* | 3/2004 | Bronnimann | .......... | G06Q 30/02 |
| | | | | 705/14.71 |
| 2004/0068750 A1* | 4/2004 | Maa | ....................... | G06Q 30/02 |
| | | | | 725/113 |
| 2004/0186777 A1* | 9/2004 | Margiloff | ............... | G06Q 30/02 |
| | | | | 705/14.49 |
| 2005/0021521 A1* | 1/2005 | Wycoff | .................. | G06Q 30/02 |
| 2005/0192948 A1* | 9/2005 | Miller | ................. | G06F 17/3089 |
| 2005/0222900 A1* | 10/2005 | Fuloria | ................. | G06Q 30/02 |
| | | | | 705/14.54 |

* cited by examiner

*Primary Examiner* — Ranodhi Serrao
(74) *Attorney, Agent, or Firm* — Van Pelt, Yi & James LLP

(57) ABSTRACT

Techniques to measure consumption of content pages comprising a plurality of distinct content assets are disclosed. In various embodiments, content consumption signal data gathered by a plurality of clients, the content consumption signal data reflecting for at least a subset of content pages user engagement by content asset comprising the content page, is received. The received content consumption signal data and content attribute data associated with each respective content page are used to compute for each content page a content consumption metric reflecting an amount of content determined to have been consumed.

18 Claims, 12 Drawing Sheets

MEASURING CONTENT CONSUMPTION

CROSS REFERENCE TO OTHER APPLICATIONS

This application claims priority to U.S. Provisional Patent Application No. 62/154,919 entitled MEASURING CONTENT CONSUMPTION filed Apr. 30, 2015 which is incorporated herein by reference for all purposes.

BACKGROUND OF THE INVENTION

Providers of content, such as publishers of web pages or other content pages, native advertisers, or other providers of content pages, may want to know how much of the content they are providing is being consumed, e.g., by a typical content consumer, specific types of consumer, etc., and/or how effective the content has been in achieving a desired behavior, such as click through to further content, completing a purchase, etc. Tools exist to detect whether such desired behavior occurred in response to a display page or ad, but a publisher may desire to know which specific content assets drove such behavior.

Native advertising refers to displaying ads or other sponsored content in a manner that integrates such content with other, non-sponsored content in a manner that matches a native look and feel of the page or other display in which the native advertising content is included. For example, a newsfeed style of page or display may include native advertising content interspersed, e.g., in a prescribed way, among other content items presented in the newsfeed. Native advertising content may link to other, more in depth content, such as an article formatted and/or otherwise presented in a manner that is consistent with a style associated with a publisher content page in which the native ad was displayed.

Native advertising requires the distribution of content at scale into multiple publisher sites. In various embodiments, native advertising content may comprise "brand" content and can consist of a variety of editorial components including words, images, video, sound or any combination thereof. This content is used as advertising messaging.

Native advertising and other content pages may comprise multiple distinct content assets, such as images, paragraph-formatted text, bulleted lists, product comparison charts, user-posted comment sections, etc. An article (or other unit of native advertising or other content) may include multiple types of content assets. Content may include video, images, text, sub-headlines, captions, slide shows (collection of images), animated images such as GIFs, informational images (infographics), interactive elements, and embedded social content such as Twitter™ "tweets" or other social network posts.

Publishers, advertisers, and other may wish to know how much value each asset comprising a content page is contributing to an intended purpose of the page, such as to advertise a given product. So-called "heat maps" have been provided to indicate the portions of a page which users spent the most time viewing, however to date such heat maps have been of limited utility, typically merely confirming that more user time is spent viewing the top portion of a page, which may be displayed first, than portions that may require users to scroll down.

BRIEF DESCRIPTION OF THE DRAWINGS

Various embodiments of the invention are disclosed in the following detailed description and the accompanying drawings.

DETAILED DESCRIPTION

Figure 1:
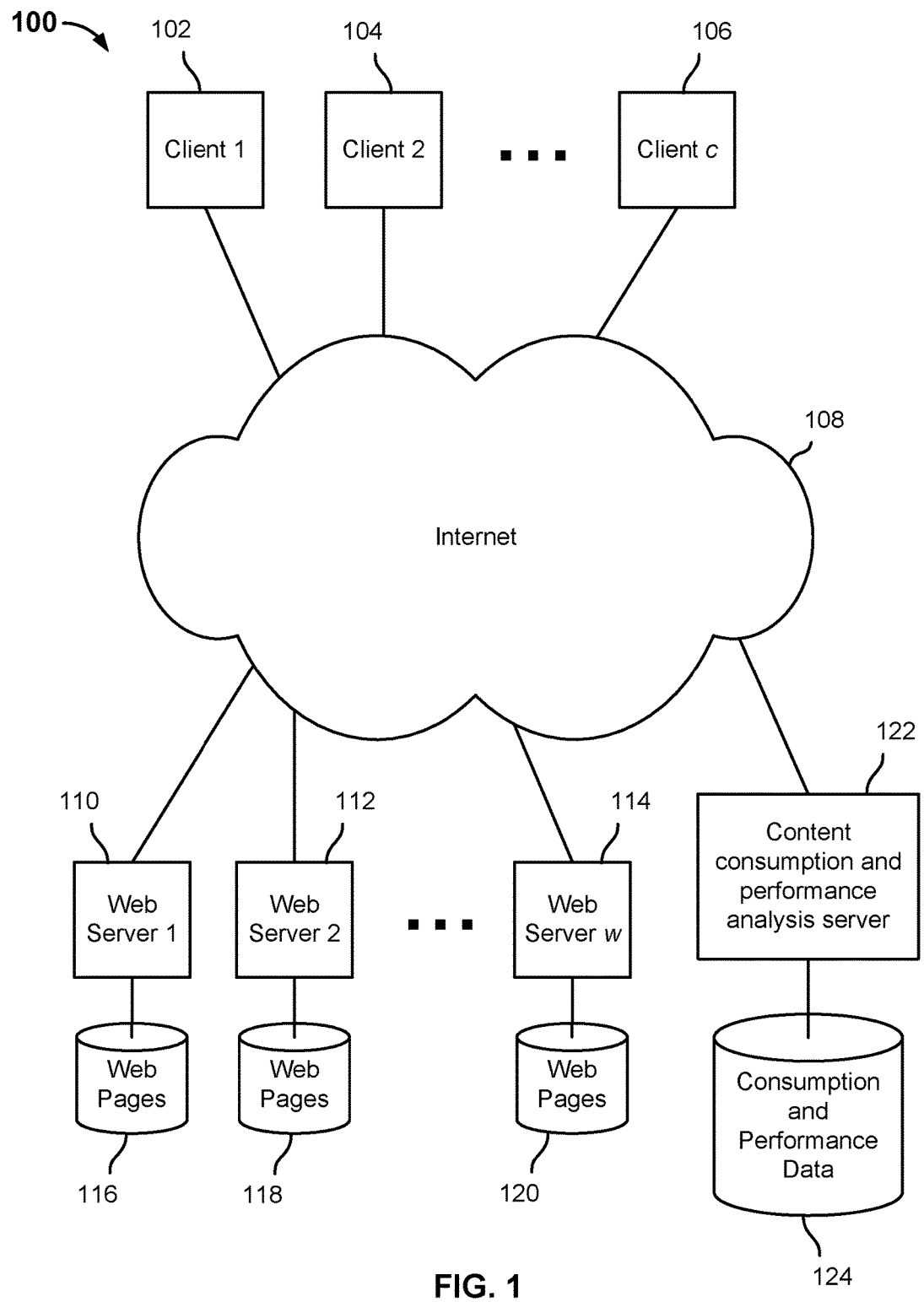
FIG. 1 is a block diagram illustrating an embodiment of a content consumption measurement system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to measure content consumption and/or performance are disclosed. In various embodiments, techniques disclosed herein may enable advertisers to understand how much of their content was consumed by the end user and/or which content assets comprising a page have been consumed. For example, how much of an article was read? How much of a video was viewed? Did the user scroll down far enough to see the image? How much of the image was on screen, and for how long? Etc.

In various embodiments, content pages may be pre-processed to ascribe to each of at least a subset of content assets comprising the page a corresponding proportion of the content value of the page. The relative value of respective content assets may be determined based on criteria such as size, placement within the page, word or other content density, complexity, semantic content, formatting, etc., and may be discounted by factors that may increase user viewing time but may not be (as) associated with a primary purpose of the content.

In various embodiments, content consumption and/or performance may be tracked by content asset, user, user type, etc. Performance may be measured, by content asset, based at least in part on post-consumption activity, e.g., the extent to which users who "consumed" a certain content asset engaged in a desired behavior (immediately, subsequent to other actions, and if so which actions, etc.), such as clicking through to more detailed content, taking action called for by such detailed content, making a purchase of an advertised product, etc.

In various embodiments, content consumption and/or performance determined as disclosed herein may be used to guide the revision of a content page, such as to make more prominent a content asset that has performed well, or to increase the visibility of an important asset that may be underperforming due to placement in the page, and/or to guide the preparation of future pages.

FIG. 1 is a block diagram illustrating an embodiment of a content consumption measurement system and environment. In the example shown, content consumption measurement system and environment 100 includes a plurality of client devices, represented in FIG. 1 by client devices 102, 104, and 106, have access via the Internet 108 to content pages downloadable from a plurality of web servers, represented in FIG. 1 by web servers 110, 112, and 114, each of which in the example shown serves web pages from an associated web page data store 116, 118, and 120, respectively.

In the example shown, a content consumption and performance analysis server and/or other system (e.g., a group of servers; agents running on one or more of client devices 102, 104, 106 and/or web servers 110, 112, 114, etc.) 122 is connected to the Internet 108. In various embodiments, content consumption and performance analysis server 122 may download from web servers (e.g., 110, 112, 114) and analyze web pages (e.g., stored in 116, 118, 120) to determine and store in content consumption and performance database 124 one or more of content page structure (e.g., page DOM or other structure information) information and content page attribute information, such as an identification of one or more content assets comprising the page and for each one or more attributes such as content asset type, content complexity, and/or other attributes associated with one or both of content consumption metrics and content performance.

Figure 2:
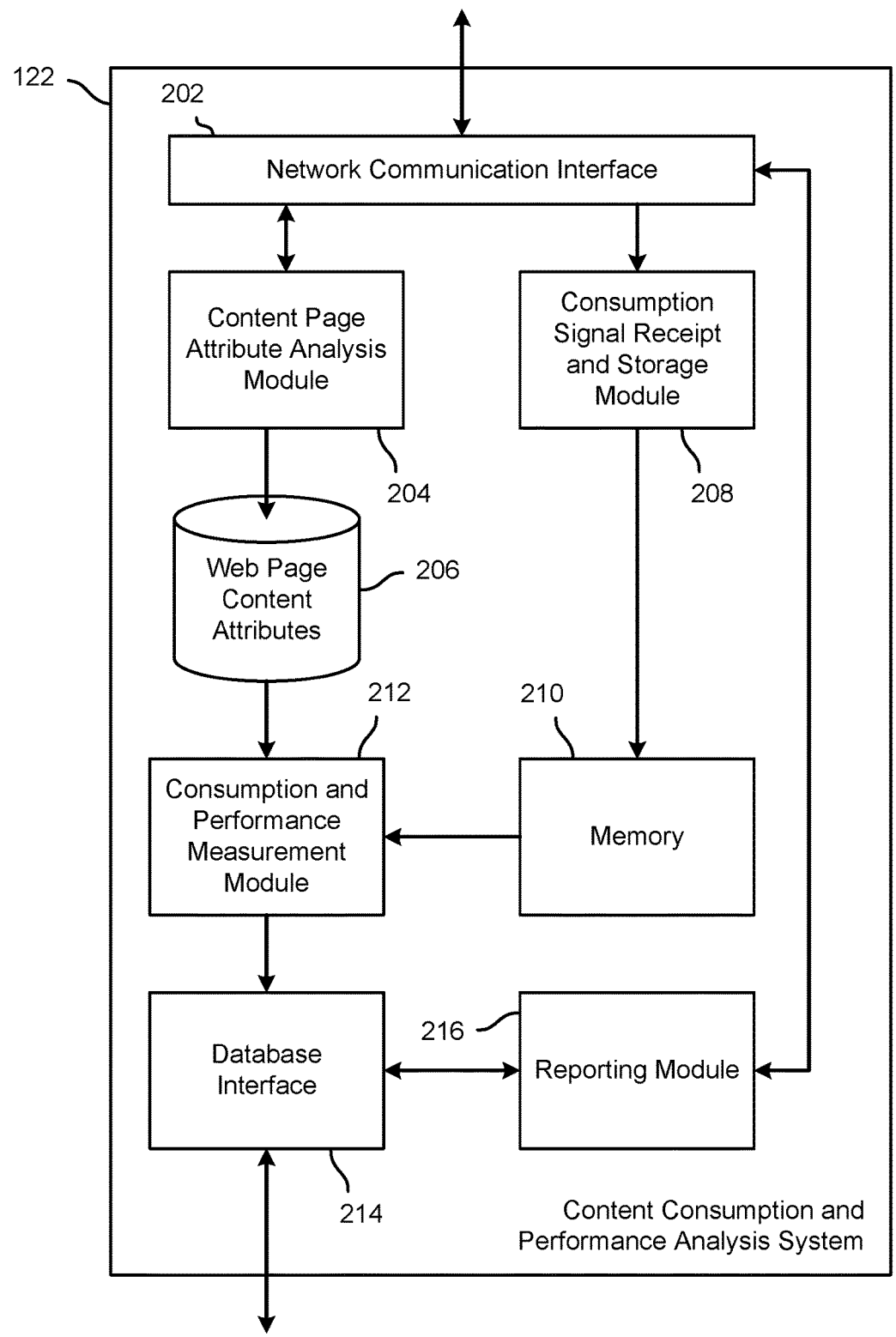
FIG. 2 is a block diagram illustrating an embodiment of a content consumption measurement system.

FIG. 2 is a block diagram illustrating an embodiment of a content consumption measurement system. In various embodiments, the content consumption measurement system shown in FIG. 2 may be used to implement content consumption and performance analysis server 122 of FIG. 1. In the example shown, content consumption and performance analysis server 122 of FIG. 1 includes a network communication interface 202, such as a network interface card and associated software components, to provide connectivity to other nodes via the Internet and/or one or more other networks. Content page attribute analysis module 204, which may comprise a functional module provided via software running on a CPU or other processor comprising content consumption and performance analysis server 122 (not shown in FIG. 2), retrieves content pages, such as web pages, a processes the pages to determine the structure and/or other content page attributes of such pages, and to store such attributes in a content page attributes database 206.

At content page display time, a consumption signal receipt and storage module 208, which may comprise a functional module provided via software running on a CPU or other processor comprising content consumption and performance analysis server 122, receives via communication interface 202 content consumption signal data from client systems/devices at which content pages have been displayed. For example, code embodied in and/or called by such content pages may cause consumption signal data to be gathered at the client and reported to which may comprise a functional module provided via software running on a CPU or other processor comprising content consumption and performance analysis server 122. Examples of consumption signal information may include, without limitation, one or more of the following: time page displayed; time each respective defined portion, e.g., each content asset comprising the page, was displayed; mouse or other cursor movement and/or click tracking data; scroll data; user agent identification and/or attribute data (e.g., browser used, display size and/or form factor, etc.); other tiles displayed concurrently with content page, and size and location of each relative to content page; etc. In the example shown, consumption signal data may be stored in a memory device 210 and/or other storage.

In the example shown, consumption and performance measurement module 212, which may comprise a functional module provided via software running on a CPU or other processor comprising content consumption and performance analysis server 122, uses content page attribute data (204, 206) and consumption signal information (208, 210) to compute content consumption and performance metrics for individual users and/or to aggregate such information across users, content pages, and/or content delivery media, devices, networks, and/or other domains. Consumption and performance module 212 stores consumption and/or performance metric data in a data, such as database 124 of FIG. 1, via a database interface 214. Consumption and/or performance metrics and/or analyses are analyzed, aggregated, and reported by a reporting module 216, which in various embodiments may comprise a functional module provided via software running on a CPU or other processor comprising content consumption and performance analysis server 122.

Figure 3:
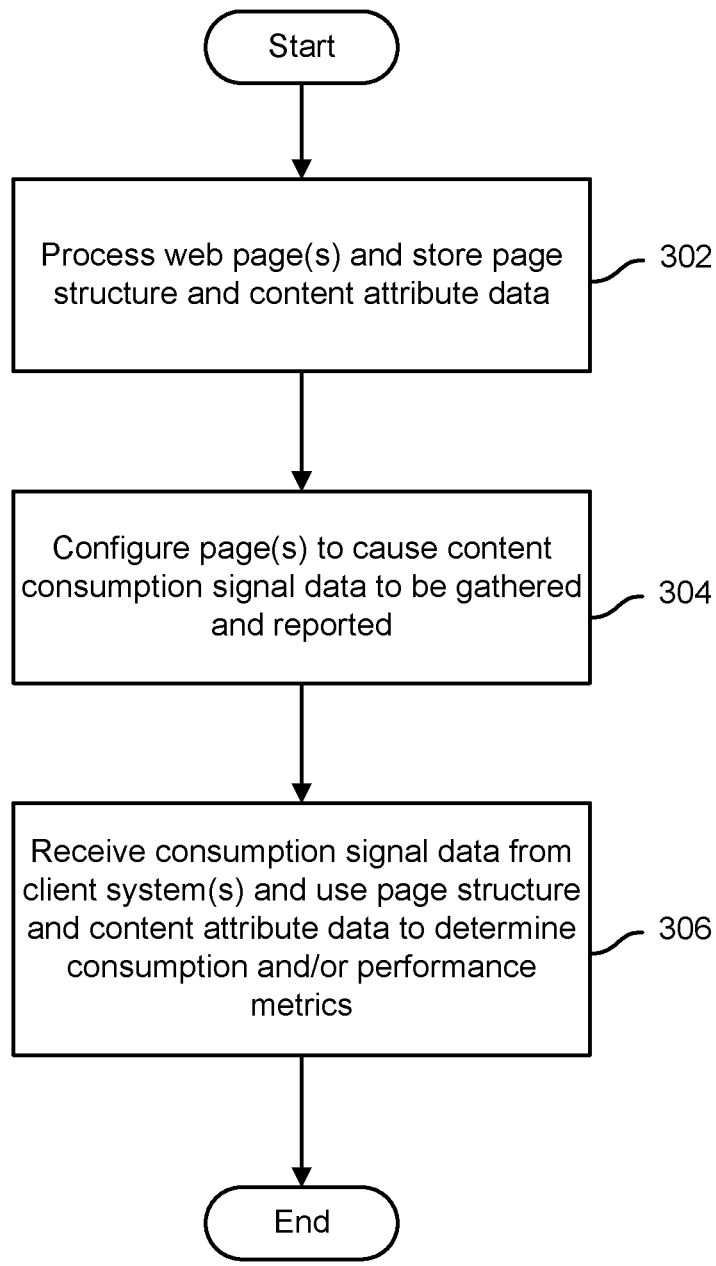
FIG. 3 is a flow chart illustrating an embodiment of a process to measure content consumption.

FIG. 3 is a flow chart illustrating an embodiment of a process to measure content consumption. In various embodiments, the process of FIG. 3 may be implemented by a content consumption and performance analysis system, such as content consumption and performance analysis server 122 of FIG. 1. In the example shown, web (or other content) pages are processed to determine and store page structure and/or content attribute data (302). Content pages are configured, e.g., by including a snippet of code, to cause content consumption signal data to be gathered and reported (304). Consumption signal data is received from client devices at which the content page(s) is/are displayed, and page structure and content attribute data are used, along with consumption signal data, to determine content consumption and/or performance metrics (306).

In various embodiments, content consumption may be determined based on one or more of the following:

- Amount of content on the page: User engagement in a crowded content environment may be determined based on factors like viewable area, mouse interactions and content placement. In various embodiments, user activities and indicators related to user activity (i.e. mouse over/mouse hover), time on page, time the article is viewed, and scroll depth and speed are taken into consideration.
- Page Layout: Cross platform and cross publisher display varies by device and environment variables like layout and positioning. Content consumption speed varies from device to device and experience to experience. In various embodiments, such factors are taken into consideration and engagement is weighed at least in part based on content positioning and flow.
- Article Viewability: Whereas in traditional environments a view of any area of the page that is viewable is counted as a view; in various embodiments other factors that may be better indicators of actual engagement are taken into consideration. For example, on load, an article may be in full view for a user and that does not necessarily translate to that user actually reading or engaging with that content. By taking into consideration other actions and event listeners like mouse movements, hover actions, scroll speed and interactions with the surrounding environment, in various embodiments, more accurate assumptions are created.
- Slideshow/Image Galleries: In various embodiments, image galleries and slideshow metrics are considered based on content consumption and weighted engagement scores. Amongst these parameters are the depth, time per image
- User's screen resolution and screen size: Assumptions based on screen size and resolution as well as the content being loaded, pre-loaded or in full view are weighted by device. Mobile devices have less real estate for diversions and provide a more focused reading pattern. Nevertheless, it allows for less content to be displayed to the user and requires more interaction form said user to consume the content.
- Scroll speed: As a measure of engagement, scroll speed may be used in various embodiments to make determinations of user attention and actual engagement. A user scrolling through an area too fast can be assumed to be a disinterested user and as a consequence the weight of the engagement metrics may be reduced. In some embodiments, scroll speed-based parameters and metrics may be used to increase the weight of user interactions that are typical of average content consumption and engaged user behavior and/or to diminish user interactions that may reflect the user may only have skimmed the content.
- Time: Time on article is not always an indicator of time engaged on article. There are complexities to how time factors into engagement. These complexities are based on the multi-dimensional nature of the content and elements on the page. An article with interactive elements that are being interacted with like a photo slider cannot be matched in engagement with an article with no elements that is not being interacted with simply because both articles drove the same time on site.

In various embodiments, metrics such as those described above may be weighted to assign more or less value to the different measures based on the factors that affect them. A specific metric, like time spent on a photo item, may be treated differently in a mobile device than on a desktop where the viewable area is in most cases larger. In various embodiments, while the metrics being used to create the assumptions may be persistent, their value is weighted based on factors affecting the environment. This provides further clarification and a more realistic view into engagement.

Figure 4:
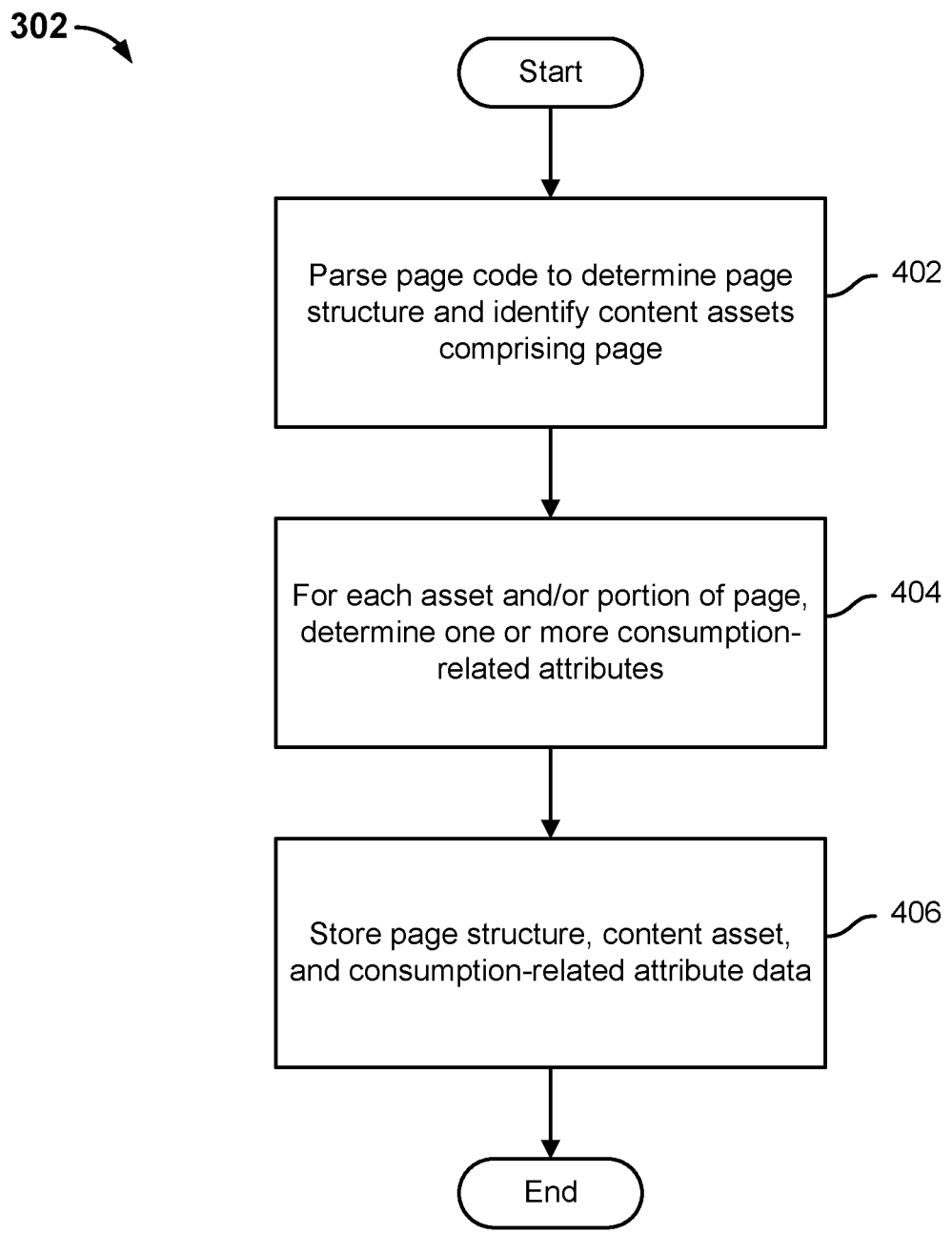
FIG. 4 is a flow chart illustrating an embodiment of a process to determine content attributes related to measuring content consumption.

FIG. 4 is a flow chart illustrating an embodiment of a process to determine content attributes related to measuring content consumption. In various embodiments, the process of FIG. 4 may be used to implement step 302 of the process of FIG. 3. In the example shown, for each content page the page source code (e.g., HTML or other markup language page code) is parsed to determine the content page's structure and to identify content assets comprising the page, such as images, sections, tables, and other identifiable portions of content (402). For each content asset comprising the page and/or a portion thereof, one or more consumption related attributes are determined (404). For example, depending on the content asset type, one or more of a main subject (e.g., of an image, text, etc.) may be extracted, and/or measures indicative of how long it may take a typical user to fully consume the asset may be determined and stored (e.g., complexity, reading level, subject, size, length, formatting, visual context, such as clutter or distracting adjacent content, etc.) For each page, the content page structure, content asset, and consumption-related attribute data is stored (406), for later use in measuring content consumption and performance, as disclosed herein.

Figure 5:
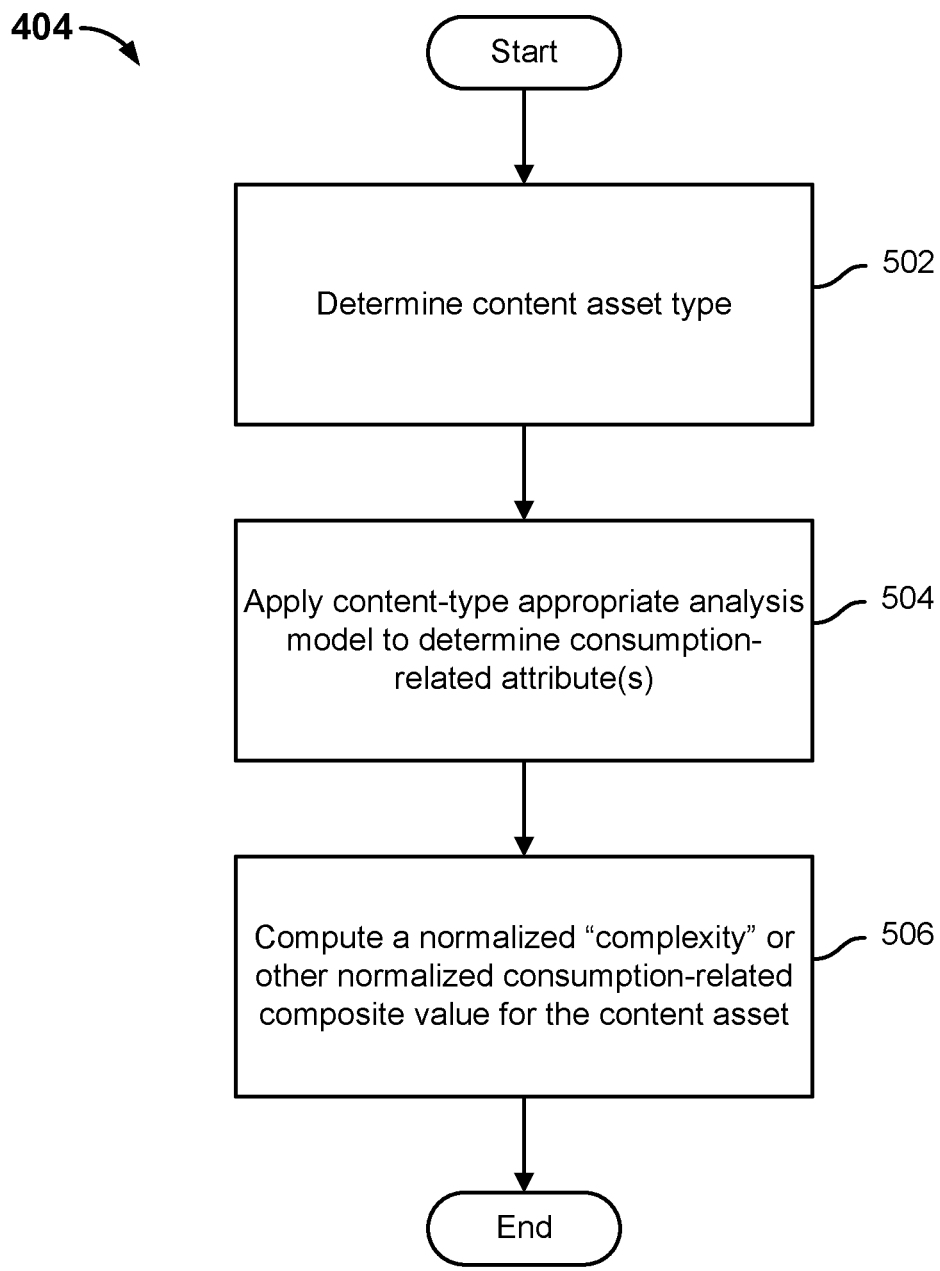
FIG. 5 is a flow chart illustrating an embodiment of a process to determine content attributes.

FIG. 5 is a flow chart illustrating an embodiment of a process to determine content attributes. In various embodiments, the process of FIG. 5 may be used to implement step 404 of the process of FIG. 4. In the example shown, for each content asset comprising a page, a content asset type of the content asset is determined (502). For example, a content asset may be classified as belong to one or more content asset types, such as image, formatted text (e.g., paragraphs), bulleted text, table, product feature table, side-by-side product comparison table, etc. A content asset type-appropriate analysis is applied to determine consumption related attributes of the content asset (504). For example, an image may be processed by retrieving and evaluating tags or other metadata associated with the image; image processing may be performed to determine a subject of the image (e.g., human face, infant, animal, etc.); social network signal data, such as "likes" may be processed, etc. Natural language and/or other techniques may be applied to text. Paragraph or other formatting (e.g., heading) information may be determined processed in the case of formatted text. A number of items may be considered in the case of bulleted or otherwise formatted lists. Etc. A normalized "complexity" (or other measure indicating a normalized and/or relative amount of value to assign to a content asset) is determined for each content asset comprising the page (506). The normalized value may take into consideration content attributes of the content asset, such as linguistic or other complexity, enhanced or discounted by such factors as placement within the content page, etc.

Figure 6:
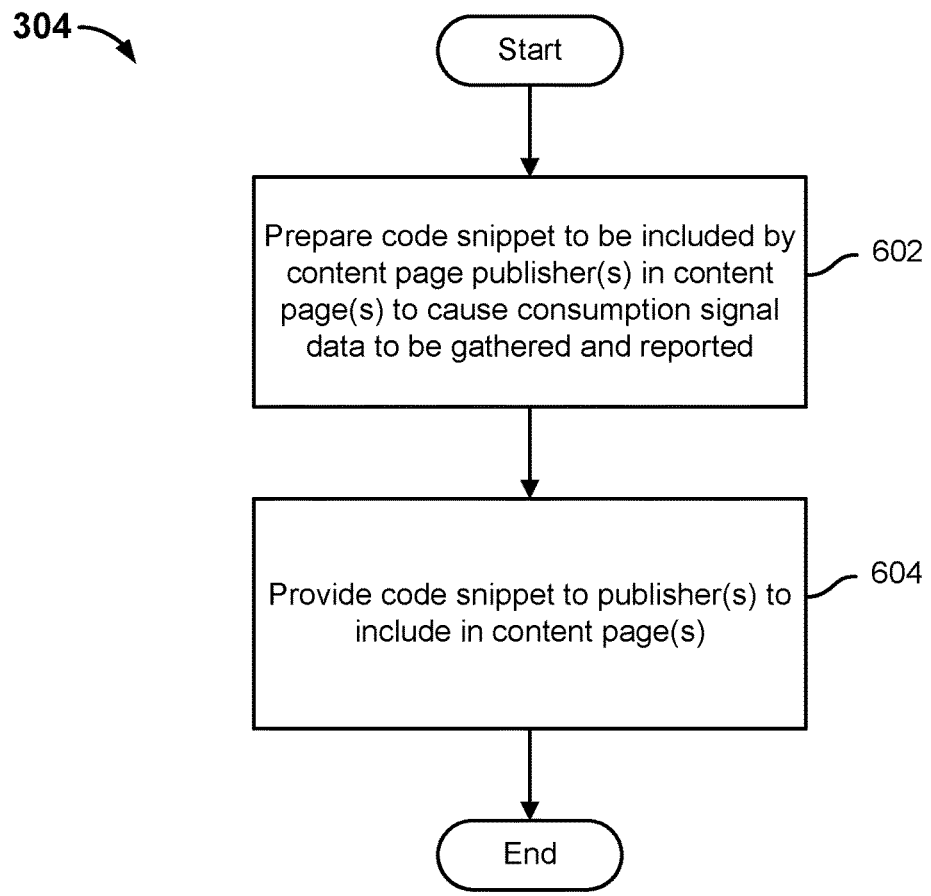
FIG. 6 is a flow chart illustrating an embodiment of a process to instrument content pages to measure content consumption.

FIG. 6 is a flow chart illustrating an embodiment of a process to instrument content pages to measure content consumption. In various embodiments, the process of FIG. 6 may be used to implement step 304 of the process of FIG. 3. In the example shown, a code snippet to be included, e.g., by publishers, in content pages to cause consumption signal information to be gathered and reported is prepared (602). The code snippet is provided to content page publishers to install on their sites to enable user engagement to be tracked, e.g., mouse movement, user time viewing page or portion thereof, which article they are viewing, etc. (604).

In some embodiments, consumption signal information may instead and/or in addition be requested from a dynamic content management system and/or a content ad server, and which content is requested and/or provided may be tracked.

In some embodiments, content consumption may be tracked by using code installed on publisher sites to measure the amount of content on the site, understand what article a given user is reading, and how much of the article they've read.

In some embodiments, the code may also track user screen size, scroll position, and such to know what is being consumed and for how long.

Figure 7:
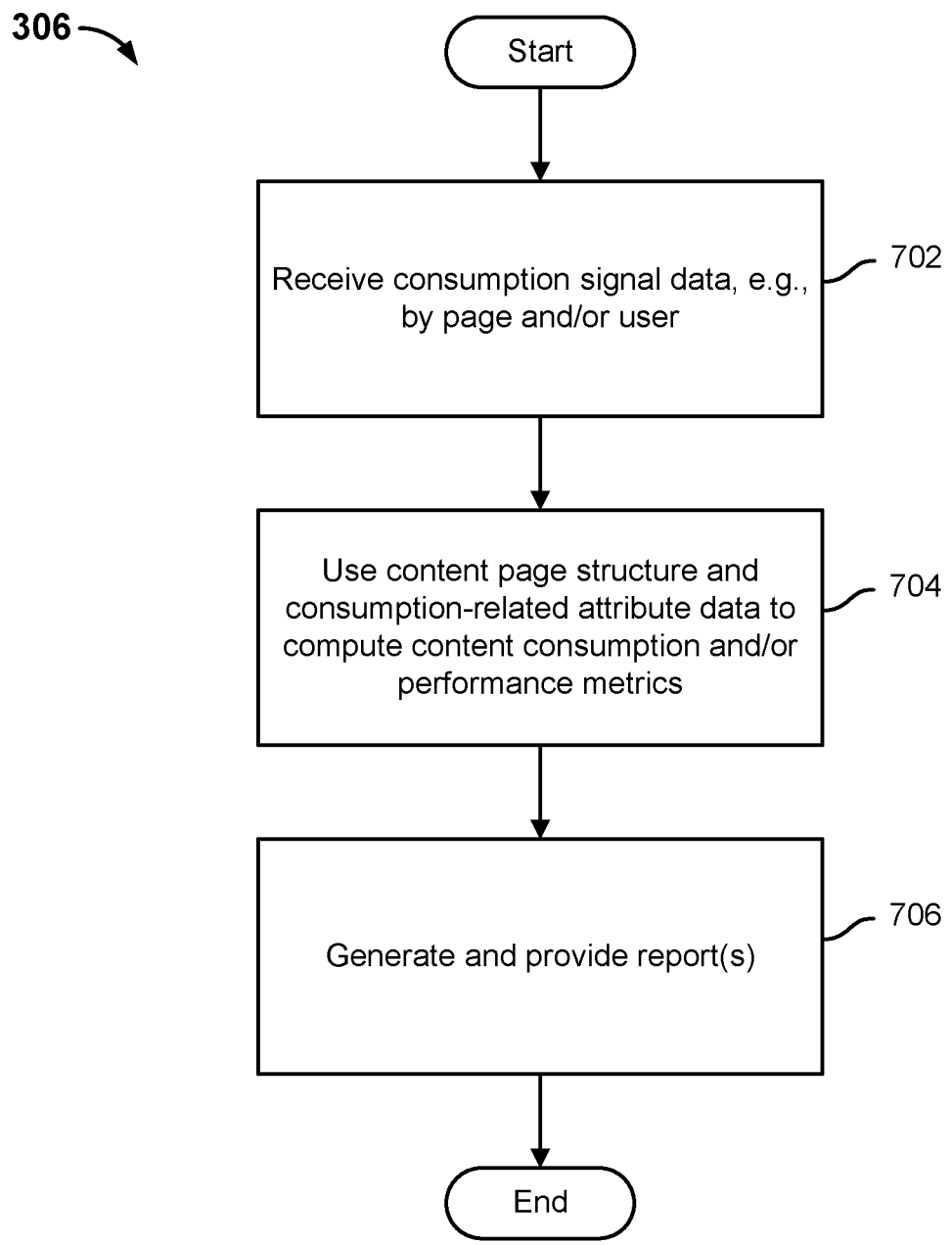
FIG. 7 is a flow chart illustrating an embodiment of a process to measure and report content consumption.

FIG. 7 is a flow chart illustrating an embodiment of a process to measure and report content consumption. In various embodiments, the process of FIG. 7 may be used to implement step 306 of the process of FIG. 3. In the example shown, consumption signal data is received, e.g., from pages downloaded by one or more users (702). The data may be aggregated and/or organized by content page, web site, user, etc. Content page structure and consumption-related attribute data (e.g., content asset type, complexity, content value, etc.) is used, in conjunction with the received consumption signal data to compute content consumption and/or performance metrics (704), For example, a content consumption percentage or other measure of content consumption may be computed for individual users, groups of user, on average across users, etc. Performance may be measure by determining by content asset, percentage completion of consumption of content comprising a page, etc., correlated with post-consumption behavior data, such as which users clicked through to read more detailed content, made a purchase, etc. Content consumption and/or performance reports are generated and provided to recipients, such as publishers, advertisers, etc. (706).

In various embodiments, content consumption is measured across sites, devices, users, media, channel, etc. The challenge of measuring content consumption when distributed across sites includes but is not limited to the fact that user engagement may be desired to be measured across any combination of websites, digital platforms, mobile devices, set top boxes, gaming platforms, streaming devices, embedded software and/or operating systems. In various embodiments, computed content consumption metrics are normalized across sites, etc. to enable consumption to be measured and compared across sites.

The complexities associated with the effective measurement of content are emphasized in some embodiments by the diversity of devices and user configurations (screen size for example) through which the content is consumed.

For a given instance of a user engaging with a given article (or other content), elements of the article that are in view on the user's screen may be monitored. Each person's screen may vary in size, viewable area and device. In various embodiments, how much time the user spent on each viewable section may be recorded. A scroll speed and dwell time per section may be taken into consideration to determine if the person consumed that section of the article.

In some embodiments, indicia of non-engagement may be measured and taken into consideration. For example, if a full article is in view on the screen, even if the user met the time requirement to consume the content, it may assume that they were not engaged if there is no mouse movement after the page is loaded and if the browser window or tab that the content loaded in was not in-view. It may also be assumed that the user abandoned the page if too much time was spent on the page. If the user scrolls to the bottom of the article but scrolls too quickly through a section of the content, the engagement for that section would not be counted or mostly not counted as the user would have scrolled too quickly to consume that portion of the article.

Figure 8:
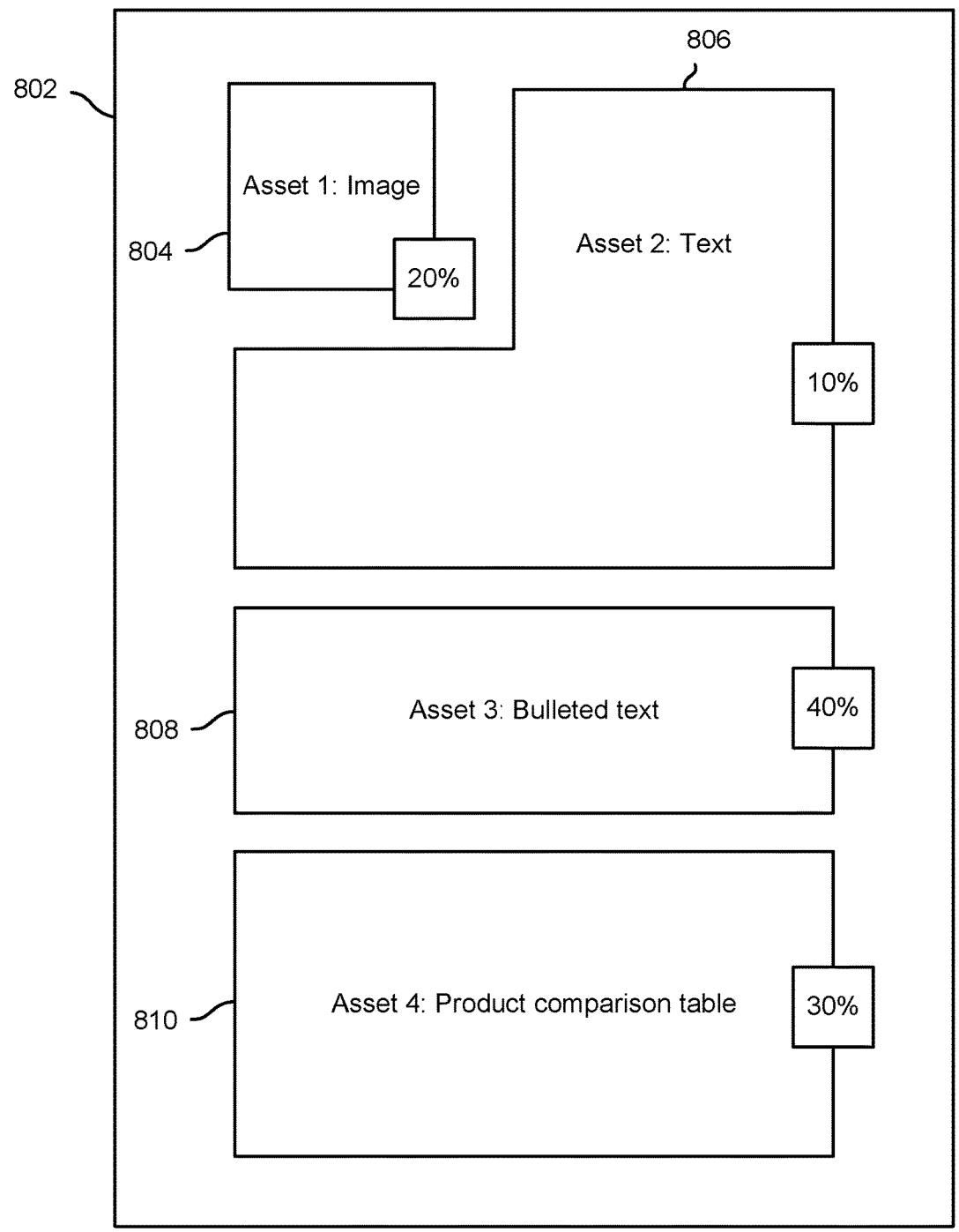
FIG. 8 is a diagram illustrating an example of a content consumption "map" display in an embodiment of a content consumption measurement system.

FIG. 8 is a diagram illustrating an example of a content consumption "map" display in an embodiment of a content consumption measurement system. In various embodiments, a content consumption map such as map 802 in the example shown may be generated by a content consumption measurement system, such as content consumption and performance analysis server 122 of FIG. 1. In the example shown, content consumption map 802 includes for each of a plurality of content assets 804, 806, 808, and 810 a corresponding display area in which an asset identification data is displayed (e.g., "Asset 1: image") indicating a content asset identifier and content asset type are indicated. For each content asset, a corresponding normalized content consumption metric value is displayed. For example, in the example shown map 802 shows content completion metric values of 20%, 10%, 40%, and 30%, respectively, for each of content assets 804, 806, 808, and 810.

In various embodiment, a content consumption map display may include for each content asset, in some embodiments including both sponsored (e.g., advertising) and non-sponsored content assets, an indication of an expected amount of time (and/or other indicia of consumption) for the average user (or some specific relevant user or set of users) to consume fully the content comprising that content asset. In some embodiments, a percentage completion as shown in the content completion map display may indicate for each content asset a percentage completion, on average, of that content asset, e.g., based at least in part on the expected time (and/or other indicia) required to consume the asset as compared to actual observed time across one or more users. In some embodiments, the computation based on actual time viewing an asset may be "normalized" or otherwise adjusted based on factors such as placement within the page, whether scrolling was required to view the content, and/or contextual and/or qualitative factors deemed to increase or decrease the significance, effectiveness, and/or value of time spent viewing a given asset.

In various embodiments, a content consumption map such as map 802 may be generated for each of a plurality of sets of users. For example, in some embodiments, a separate content consumption map such as map 802 may be generate for each of a plurality of demographic groups, e.g., age, gender, geographic area, etc., enabling content consumption behavior to be compared across such groups. Such comparison may reveal, for example, that certain content assets are more effective than others in reaching a given target demographic. If that target demographic is of particular interest, existing content pages and/or future pages may be updated and/or created to include and/or feature more prominently content assets that have been observed to be particularly more likely to be consumed by viewers in that demographic group, as compared to others.

In some embodiments, color or other visual attributes may be used to indicate the relative percentage consumption of content assets comprising a page. For example, content assets with higher (normalized) content consumption may be shown in a darker or more intense color than assets having lower computed (normalized) consumption. In some embodiments, the content consumption value for an asset may be weighted (increased) to reflect the observed performance of the content asset (e.g., a high percentage of those users who consumed 50% or more of the content asset clicked through to more detailed content); pre- or post-consumption behavior (e.g., a relatively high proportion of users directed their attention away from but then returned to the content before performing some desired behavior, such as clicking through to related content); or other measures of the relative substantive content, value, and/or performance of the asset. In some embodiments, observed consumption may be discounted to adjust for consumption that may not be fully indicative of content performance. For example, image content may attract users' attention for reasons not necessarily related to content performance, such as an image of a cute baby, a puppy, etc. In some embodiments, a consumption metric value may be increased to reflect a level of user commitment indicated by consumption of an asset, such as by scrolling to the bottom of a page as displayed, etc.

Figure 9:
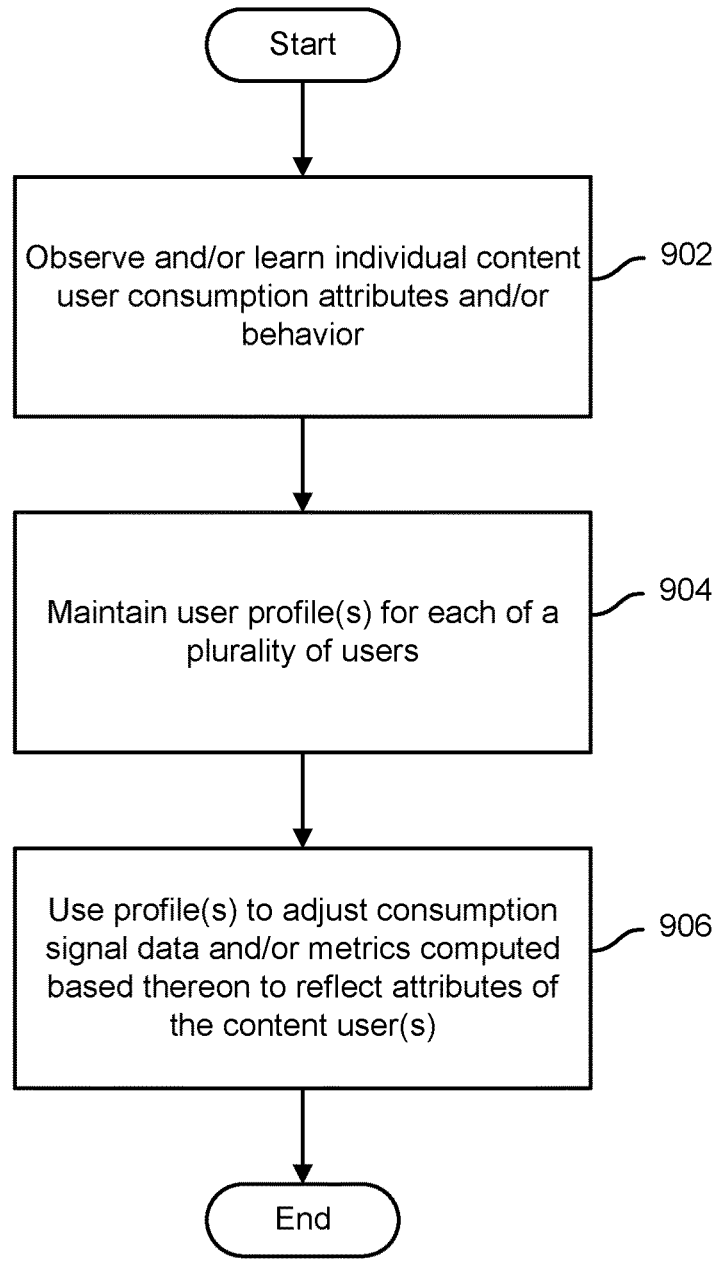
FIG. 9 is a flow chart illustrating an embodiment of a process to measure content consumption based at least in part on individual user attributes.

FIG. 9 is a flow chart illustrating an embodiment of a process to measure content consumption based at least in part on individual user attributes. In various embodiments, the process of FIG. 9 may be implemented by a content consumption and performance analysis system, such as content consumption and performance analysis server 122 of FIG. 1. In the example shown, individual content consumption user attributes and/or behavior are determined, observed, learned, etc. (902). For example, scroll rates, time spent on content assets of various types prior to indicia of completion, etc. may be observed and compared to average consumption rates for assets of the same type. User profiles may be maintained for each user (904). User content consumption attributes as stored in such profiles may be used to adjust consumption signal data and/or consumption metrics determined based thereon to reflect individual user attributes (906).

In various embodiments, a baseline is determined based on how much time it takes an average person to consume each article based on the content assets that an article contains. Individual user profile and/or observed user behavior may be used to adjust based on whether the user consumes content of the relevant type (e.g., by asset) at a slower or faster rate than average.

Other considerations: international content consumption speeds may vary from region to region. In some embodiments, normalized consumption metrics may be adjusted to reflect such differences. For example, if regional differences are such that an item of content may be expected to require 20% more time to be consumed in Region A than in Region B, then to be assigned a same consumption value a user in Region A may need to have been engaged with the same content for 20% longer than a corresponding user in Region B.

Content consumption speeds may vary per device (such as a mobile device vs a desktop computer). The methodology in various embodiments adjusts consumption time assumptions based on the device being used by the user to view the content.

In various embodiments, the methodology takes into consideration other factors that make up a comprehensive picture of user engagement. A complex mix of engagement metrics, patterns, consumption speeds, devices, screens, layouts, view-ability and signals may be considered. In various embodiments, one or more of the foregoing list of considerations may be used to track engagement based on the environment, activity, technology and capabilities which affect performance and in turn engagement.

Figure 10:
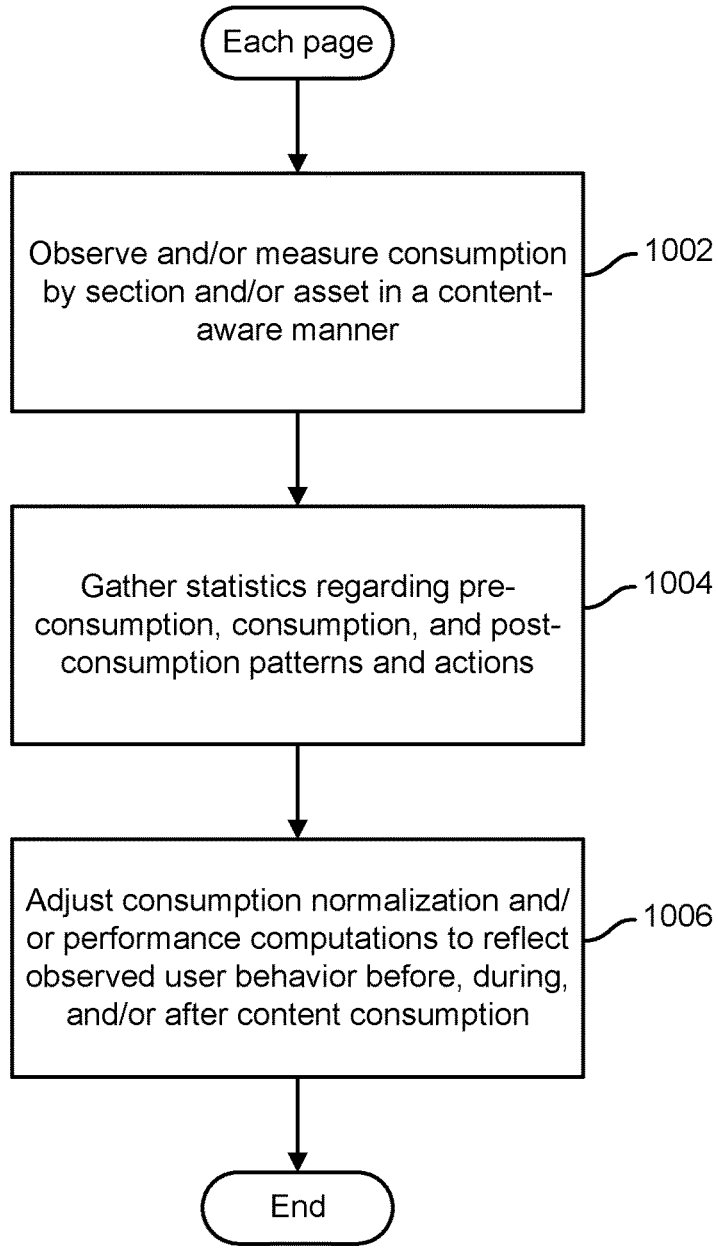
FIG. 10 is a flow chart illustrating an embodiment of a process to adjust content consumption measurement based on observed user behavior.

FIG. 10 is a flow chart illustrating an embodiment of a process to adjust content consumption measurement based on observed user behavior. In various embodiments, the process of FIG. 10 may be implemented by a content consumption and performance analysis system, such as content consumption and performance analysis server 122 of FIG. 1. In the example shown, for each content page, content consumption by content asset, segment, section, etc. is observed and/or measured in a content-aware manner, i.e., to reflect content complexity, asset type, etc., as disclosed herein (1002). Statistics are gathered regarding pre-consumption, content consumption, and/or post-consumption patterns and actions (1004). For example, each user's actions prior to engage with the subject content may be observed, e.g., how each user arrived at the page. Post-consumption patterns may include returning to further consume an asset after having navigated away from it and/or engaging in some desired behavior, such as clicking through to related content. Content consumption and/or performance computations may be adjusted to reflect observed content effectiveness (1006). For example, content originally determined to comprise a first percentage of the relative content value of a page may be increased relative to other assets comprising the page to reflect performance of that asset.

In various embodiments, a content consumption metric as disclosed herein may be used for other media such as video where completion rates are used as an indicator of performance. For example, the number of users or % of exposed users that finished at least 25%, 50%, 75%, and consumed all of the content is reported for video campaigns. Prior to the techniques disclosed herein, this metric has not been available for articles that may include other forms of content-with video, the overall length of the video and the amount of time a user spends watching the video or the frame of video that is reached while the video is viewable on the screen can be used to determine these completion rates. With an article comprised of various content assets, there is no overall length that can be easily determined and time alone cannot be used to measure completion since the entirety of an article may not fit on a user's screen. In various embodiments, techniques disclosed herein are used to create a multi-dimensional measure of content consumption that is more accurate and in line with user behavior and engagement. In various embodiments, a unified "normalized" metric that can easily be used to compare the success of very different type of contents being consumed in various forms is provided.

Figure 11:
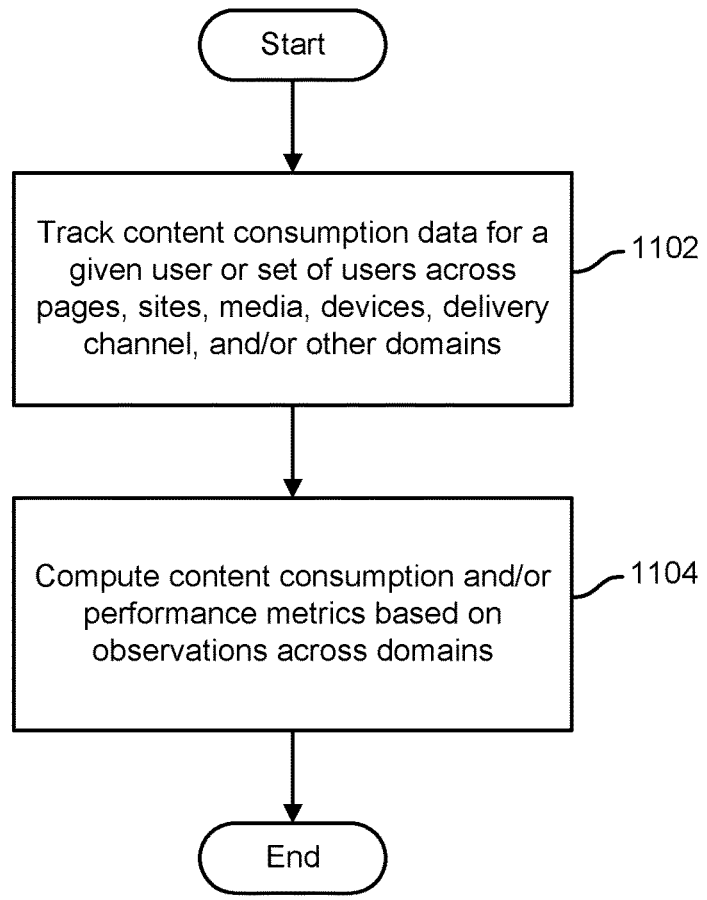
FIG. 11 is a flow chart illustrating an embodiment of a process to measure and report content consumption across content sources and types.

FIG. 11 is a flow chart illustrating an embodiment of a process to measure and report content consumption across content sources and types. In various embodiments, the process of FIG. 11 may be implemented by a content consumption and performance analysis system, such as content consumption and performance analysis server 122 of FIG. 1. In the example shown, content consumption data is tracked for a user or set of users across content pages, sites, media, devices, delivery channels, and/or other domains (1102). For example, a user's consumption of related content across web pages, related television ads, streaming media ads, etc., may be tracked, normalized to reflect platform/channel differences, and aggregated to determine a level of content consumption for the user. Performance may be determined based on observations across domains (1104).

In various embodiments, the challenge of measuring content consumption when distributed across sites includes but is not limited to the fact that user engagement may be desired to be measured across any combination of websites, digital platforms, mobile devices, set top boxes, gaming platforms, streaming devices, embedded software and/or operating systems.

Figure 12:
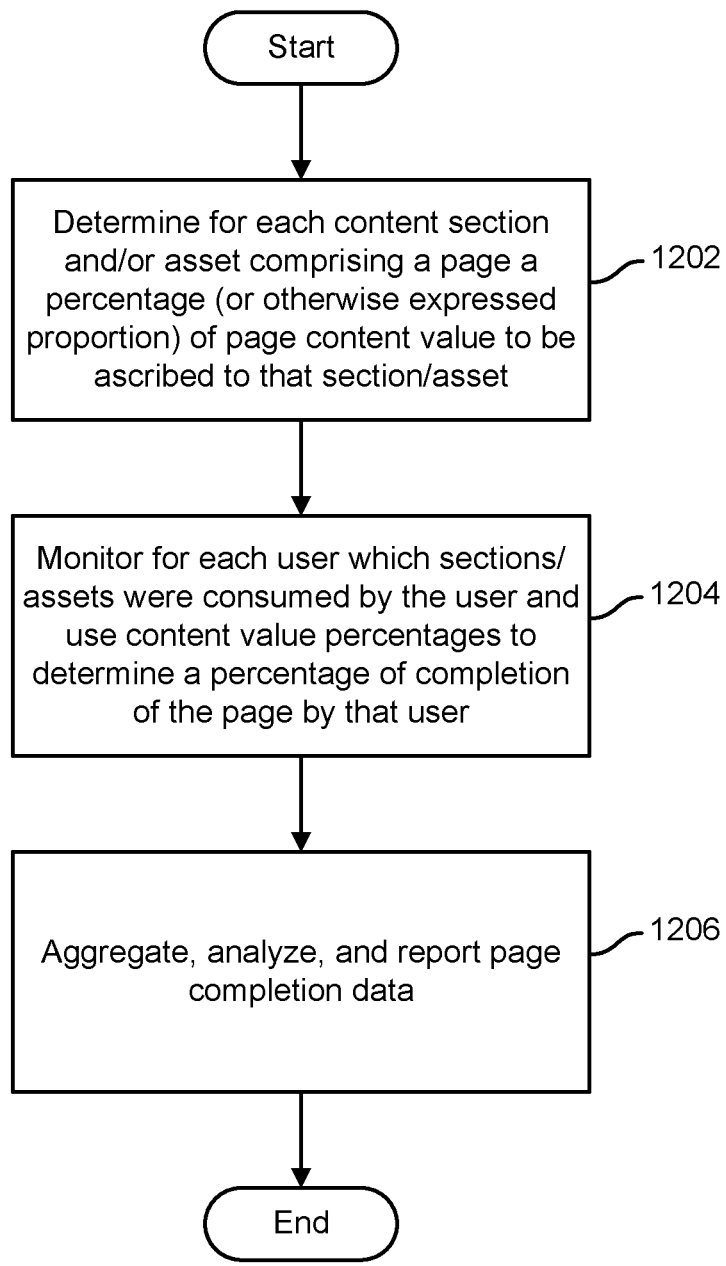
FIG. 12 is a flow chart illustrating an embodiment of a process to measure consumption based on content value.

FIG. 12 is a flow chart illustrating an embodiment of a process to measure consumption based on content value. In various embodiments, the process of FIG. 12 may be implemented by a content consumption and performance analysis system, such as content consumption and performance analysis server 122 of FIG. 1. In the example shown, for each content section and/or asset comprising a page a percentage (or otherwise expressed proportion) of page content value to be ascribed to that section/assert is determined (1202). For example, natural language techniques, taxonomies, semantic models, etc. may be used to determine a content value for each asset, and the respective content values may be compared to determine a distribution of content value for the page. For example, raw content values may be compared to determine a percentage content value for each asset, the percentages adding up to 100% of the content value of the page.

For each user who views the page, the user's interaction with the page/content is monitored to determine the content sections (assets) the user has consumed, and the compute percentages by section/asset are used to determine how much of the content the user consumed (1204).

For example, if under the metrics being used ½ the content of an article is considered to be included in the article's text and the ½ in a single photograph, a user who based on metrics and factors disclosed herein is determined to have viewed the photo actively long enough to be considered to have fully consumed it and who read ⅓ the text would be considered to have consumed ⅔ of the content of the article (½+⅓*½=⅔).

Computed consumption metrics may be aggregated, analyzed, and reported (1206), e.g., by user, aggregated by user type or attribute, etc. (1206).

In various examples described herein the term "article" has been used to refer to a collection of content assets, but the techniques disclosed herein can be used to determine completion rates of content that typically would not be called an article, including without limitation other collections of different types of content, a slide show with captions, a "listicle" or an article primarily comprised of images or animated images, a map, or a single image.

In various embodiments, measuring content consumption at scale in metrics that are familiar to traditional market research, e.g., by computed a normalized content consumption metric aggregated across all content comprising an article or other unit of content (e.g., % of content consumed across all types of content comprising an article) may be used to understand the true performance of content as both stand-alone and syndicated assets. A brands perception, influence and relevancy in context and at scale enable publishers and/or advertisers to better understand whitespace, opportunity, pivots and rationales. In various embodiments, techniques disclosed herein may generate metrics that align to how advertisers are accustomed to measuring campaign performance at scale.

In various embodiments, a unified measuring unit that enables attention and/or content consumption to be compared readily across different executions is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A content consumption measurement system, comprising:
   a communication interface; and
   a processor coupled to the communication interface and configured to:
      receive via the communication interface content consumption signal data gathered by a plurality of clients, the content consumption signal data reflecting for at least a subset of content pages user engagement by content asset comprising the content page;
      use the received content consumption signal data and content attribute data associated with each respective content page to compute for each content page a content consumption metric reflecting an amount of content determined to have been consumed;
      generate and display for each of one or more content pages comprising said at least a subset of content pages, a content consumption map indicating visually for each of a plurality of content assets comprising the content page, a content performance metric value computed for that content asset; and
      generate and display for each content page a demographically-specific content consumption map, each map indicating visually for each of a plurality of content assets comprising the content page, a content performance metric value computed for that content asset with respect to a demographic group with which the demographically-specific content consumption map is associated.

2. The system of claim 1, wherein the content attribute data comprises content page structure data.

3. The system of claim 1, wherein the content attribute data comprises content asset type data.

4. The system of claim 1, wherein the content attribute data is associated with an amount of time required to consume a content asset.

5. The system of claim 4, wherein the content attribute data is determined programmatically by analyzing content data comprising the content asset.

6. The system of claim 4, wherein the content attribute data is determined based at least in part on a content asset type of the content asset.

7. The system of claim 1, wherein the content attribute data indicates for each of a plurality of content assets comprising a content page a corresponding proportion of content value of the content page that has been determined to be embodied in that content asset.

8. The system of claim 7, further comprising determining programmatically, for each content asset comprising a content page, said corresponding proportion of content value of the content page that has been determined to be embodied in that content asset.

9. The system of claim 1, wherein said clients are configured by instrumentation code included in said content pages to gather and report said consumption signal data.

10. The system of claim 1, wherein said content attribute data reflects for each of a plurality of content assets comprising a page a corresponding content value attribute and wherein said content value attributes are weighted to reflect programmatically determined content attributes of each respective content asset.

11. The system of claim 10, wherein said normalized content value attributes reflect a discounted value for content determined to be potentially of interest to users for reasons not fully aligned with a primary objective associated with said content page.

12. The system of claim 1, wherein the processor is further configured to aggregate content consumption data across content pages to determine a composite content consumption metric value.

13. The system of claim 1, wherein the processor is further configured to aggregate content consumption data across one or more of devices, media, and channels to determine a composite content consumption metric value.

14. The system of claim 1, wherein the processor is further configured to determine and report a content performance metric based at least in part on said computed content consumption metrics and indicia of effectiveness of such consumption.

15. A method to measure content consumption, comprising:
receiving at a content consumption measurement system, via a communication interface, content consumption signal data gathered by a plurality of clients, the content consumption signal data reflecting for at least a subset of content pages user engagement by content asset s comprising the content page;
using the received content consumption signal data and content attribute data associated with each respective content page to compute for each content page a content consumption metric reflecting an amount of content determined to have been consumed;
generating and displaying for each of one or more content pages comprising said at least a subset of content pages, a content consumption map indicating visually for each of a plurality of content assets comprising the content page, a content performance metric value computed for that content asset; and
generating and displaying for each content page a demographically-specific content consumption map, each map indicating visually for each of a plurality of content assets comprising the content page, a content performance metric value computed for that content asset with respect to a demographic group with which the demographically-specific content consumption map is associated.

16. The method of claim 15, wherein the content attribute data is associated with an amount of time required to consume a content asset.

17. The method of claim 16, wherein the content attribute data is determined programmatically by analyzing content data comprising the content asset.

18. A computer program product to measure content consumption, the computer program product being embodied in a non-transitory computer readable storage medium and comprising is computer instructions for:
receiving content consumption signal data gathered by a plurality of clients, the content consumption signal data reflecting for at least a subset of content pages user engagement by content asset comprising the content page;
using the received content consumption signal data and content attribute data associated with each respective content page to compute for each content page a content consumption metric reflecting an amount of content determined to have been consumed;
generating and displaying for each of one or more content pages comprising said at least a subset of content pages, a content consumption map indicating visually for each of a plurality of content assets comprising the content page, a content performance metric value computed for that content asset; and
generating and displaying for each content page a demographically-specific content consumption map, each map indicating visually for each of a plurality of content assets comprising the content page, a content performance metric value computed for that content asset with respect to a demographic group with which the demographically-specific content consumption map is associated.

* * * * *

UNITED STATES PATENT AND TRADEMARK OFFICE
CERTIFICATE OF CORRECTION

PATENT NO. : 9,912,768 B1
APPLICATION NO. : 15/142439
DATED : March 6, 2018
INVENTOR(S) : Justin Yoo Choi It is certified that error appears in the above-identified patent and that said Letters Patent is hereby corrected as shown below:

In the Claims

In Column 13, Claim 15, Line 31, delete "asset s" and insert --assets--, therefor.

Signed and Sealed this
Fourteenth Day of August, 2018

Andrei Iancu
*Director of the United States Patent and Trademark Office*